(12) United States Patent
Jang et al.

(10) Patent No.: US 11,736,736 B2
(45) Date of Patent: *Aug. 22, 2023

(54) IMAGE CODING METHOD AND DEVICE USING DEBLOCKING FILTERING

(71) Applicant: LG ELECTRONICS INC., Seoul (KR)

(72) Inventors: Hyeongmoon Jang, Seoul (KR); Junghak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,533

(22) Filed: Mar. 7, 2022

(65) Prior Publication Data

US 2022/0191552 A1     Jun. 16, 2022

Related U.S. Application Data

(63) Continuation of application No. 17/356,016, filed on Jun. 23, 2021, now Pat. No. 11,310,534, which is a (Continued)

(51) Int. Cl.
*H04N 19/176* (2014.01)
*H04N 19/82* (2014.01)
(Continued)

(52) U.S. Cl.
CPC ........... *H04N 19/82* (2014.11); *H04N 19/117* (2014.11); *H04N 19/176* (2014.11); *H04N 19/85* (2014.11)

(58) Field of Classification Search
CPC ............................. C14B 1/44; C14B 2700/16
See application file for complete search history.

(56) References Cited

U.S. PATENT DOCUMENTS 9,503,758 B2 *  11/2016  Jang ...................... H04N 19/50
2011/0032990 A1 *  2/2011  Choi .................... H04N 19/176
                                                                375/240.13
(Continued)

FOREIGN PATENT DOCUMENTS

KR      20110014000 A      2/2011
KR      20170068460 A      6/2017
(Continued)

*Primary Examiner* — MD N Haque
(74) *Attorney, Agent, or Firm* — Bryan Cave Leighton Paisner LLP

(57) ABSTRACT

A method by which a decoding device decodes an image, according to the present document, comprises the steps of: generating a restoration picture on the basis of prediction samples of a coding block; deriving a boundary strength (BS) for a boundary of the coding block in the restoration picture; performing deblocking filtering on the boundary of the coding block on the basis of the boundary strength; and deriving a modified restoration picture for the restoration picture on the basis of the deblocking filtering, wherein the boundary strength is derived on the basis of a prediction mode of a first block and a second block that are adjacent to the boundary of the coding block, and the prediction mode of the first block or the second block is derived on the basis of whether the prediction mode of the first block or the second block is a current picture referencing (CPR) mode to be coded in reference to a current picture.

11 Claims, 9 Drawing Sheets

Related U.S. Application Data continuation of application No. PCT/KR2020/000025, filed on Jan. 2, 2020.

(60) Provisional application No. 62/787,743, filed on Jan. 2, 2019.

(51) Int. Cl.
*H04N 19/117* (2014.01)
*H04N 19/85* (2014.01)

(56) References Cited

U.S. PATENT DOCUMENTS

| | | | |
|---|---|---|---|
| 2013/0034169 A1* | 2/2013 | Sadafale | H04N 19/436 |
| | | | 375/E7.026 |
| 2015/0154740 A1* | 6/2015 | Jang | H04N 19/194 |
| | | | 375/240.13 |
| 2016/0100163 A1* | 4/2016 | Rapaka | H04N 19/182 |
| | | | 375/240.16 |
| 2016/0360210 A1 | 12/2016 | Xiu et al. | |
| 2018/0242022 A1* | 8/2018 | Park | H04N 19/172 |
| 2020/0322599 A1* | 10/2020 | Chuang | H04N 19/52 |

FOREIGN PATENT DOCUMENTS

| | | |
|---|---|---|
| KR | 20170084251 A | 7/2017 |
| WO | 2017206804 A1 | 12/2017 |

* cited by examiner

IMAGE CODING METHOD AND DEVICE USING DEBLOCKING FILTERING

CROSS-REFERENCE TO PRIOR APPLICATIONS

This application is a continuation of U.S. patent application Ser. No. 17/356,016, filed Jun. 23, 2021, which is a Bypass Continuation of International Application No. PCT/KR2020/000025, filed Jan. 2, 2020 (published Jul. 9, 2020 as WO 2020/141885 A1), which claims priority to and the benefit of U.S. Provisional Application No. 62/787,743, filed Jan. 2, 2019, each hereby expressly incorporated by reference in its entirety.

BACKGROUND OF THE DISCLOSURE

Field of the Disclosure

The present document relates to an image coding technology, and more specifically, to an image coding method and apparatus using a deblocking filter process.

Related Art

The demands for high-resolution and high-quality images and video, such as an ultra high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

SUMMARY

An object of the present document is to provide a method and an apparatus for enhancing image coding efficiency.

Another object of the present document is to provide a method and an apparatus for improving an image quality of an image.

Still another object of the present document is to provide a method and an apparatus for designing a boundary strength in consideration of the characteristics of a block in a process of performing a deblocking filter process.

An exemplary embodiment of the present document provides an image decoding method performed by a decoding apparatus. The method includes generating a reconstructed picture based on predicted samples of a coding block, deriving a boundary strength (bs) for a boundary of the coding block in the reconstructed picture, performing a deblocking filteringon the boundary of the coding block based on the boundary strength, and deriving a modified reconstructed picture for the reconstructed picture based on the deblocking filtering, in which the boundary strength is derived based on prediction modes of a first block and a second block adjacent to the boundary of the coding block, and derived based on whether the prediction mode of the first block or the prediction mode of the second block is a current picture referencing (CPR) mode coded with reference to a current picture.

Another exemplary embodiment of the present document provides an image encoding method performed by an encoding apparatus. The method includes generating a reconstructed picture based on predicted samples of a coding block, deriving a boundary strength (bs) for a boundary of the coding block in the reconstructed picture, performing a deblocking filtering on the boundary of the coding block based on the boundary strength, deriving a modified reconstructed picture for the reconstructed picture based on the deblocking filtering, and encoding image information including information on the coding block, in which the boundary strength is derived based on prediction modes of a first block and a second block adjacent to the boundary of the coding block, and derived based on whether the prediction mode of the first block or the prediction mode of the second block is a current picture referencing (CPR) mode coded with reference to a current picture.

Still another exemplary embodiment of the present disclosure provides a digital storage medium for storing encoded image information causing an image decoding method to be performed, as a computer readable digital storage medium.

The present document may enhance the overall image/video compression efficiency.

The present document may improve the image quality of the image/the video.

The present document may design the boundary strength in consideration of the characteristics of the block in the process of performing the deblocking filter process to efficiently remove the artifact of the boundary between the blocks, thereby improving the subjective/objective image qualities.

DESCRIPTION OF EXEMPLARY EMBODIMENTS

Figure 1:
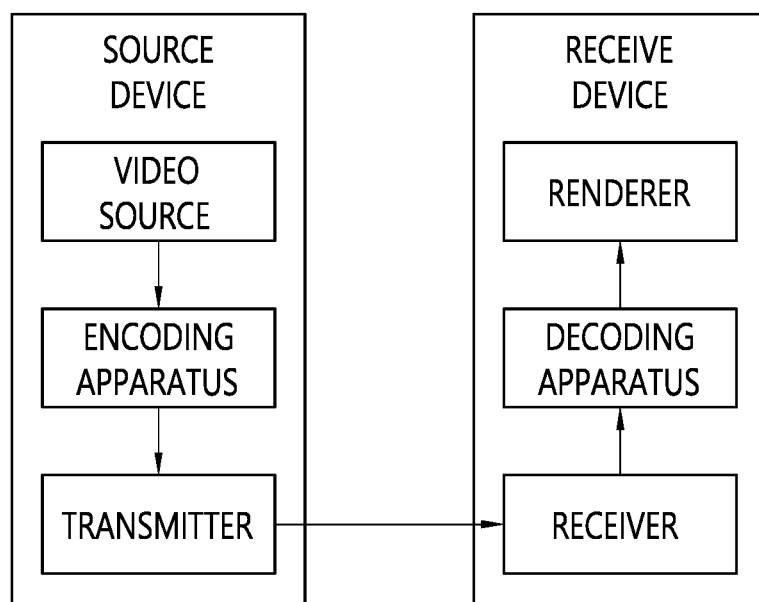
FIG. 1 schematically illustrates an example of a video/image coding system applicable to exemplary embodiments of the present document.

This document may be modified in various ways and may have various embodiments, and specific embodiments will be illustrated in the drawings and described in detail. However, this does not intend to limit this document to the specific embodiments. Terms commonly used in this specification are used to describe a specific embodiment and is not used to limit the technical spirit of this document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in this document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this document unless it deviates from the essence of this document.

Hereinafter, preferred embodiments of this document are described more specifically with reference to the accompanying drawings. Hereinafter, in the drawings, the same reference numeral is used in the same element, and a redundant description of the same element may be omitted.

FIG. 1 schematically illustrates an example of a video/image coding system to which embodiments of this document may be applied.

Referring to FIG. 1, a video/image coding system may include a first device (a source device) and a second device (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consists of either a number of complete tiles or only a consecutive sequence of complete bricks of one tile. Tile groups and slices may be used interchangeably in this document. For example, in this document, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 2:
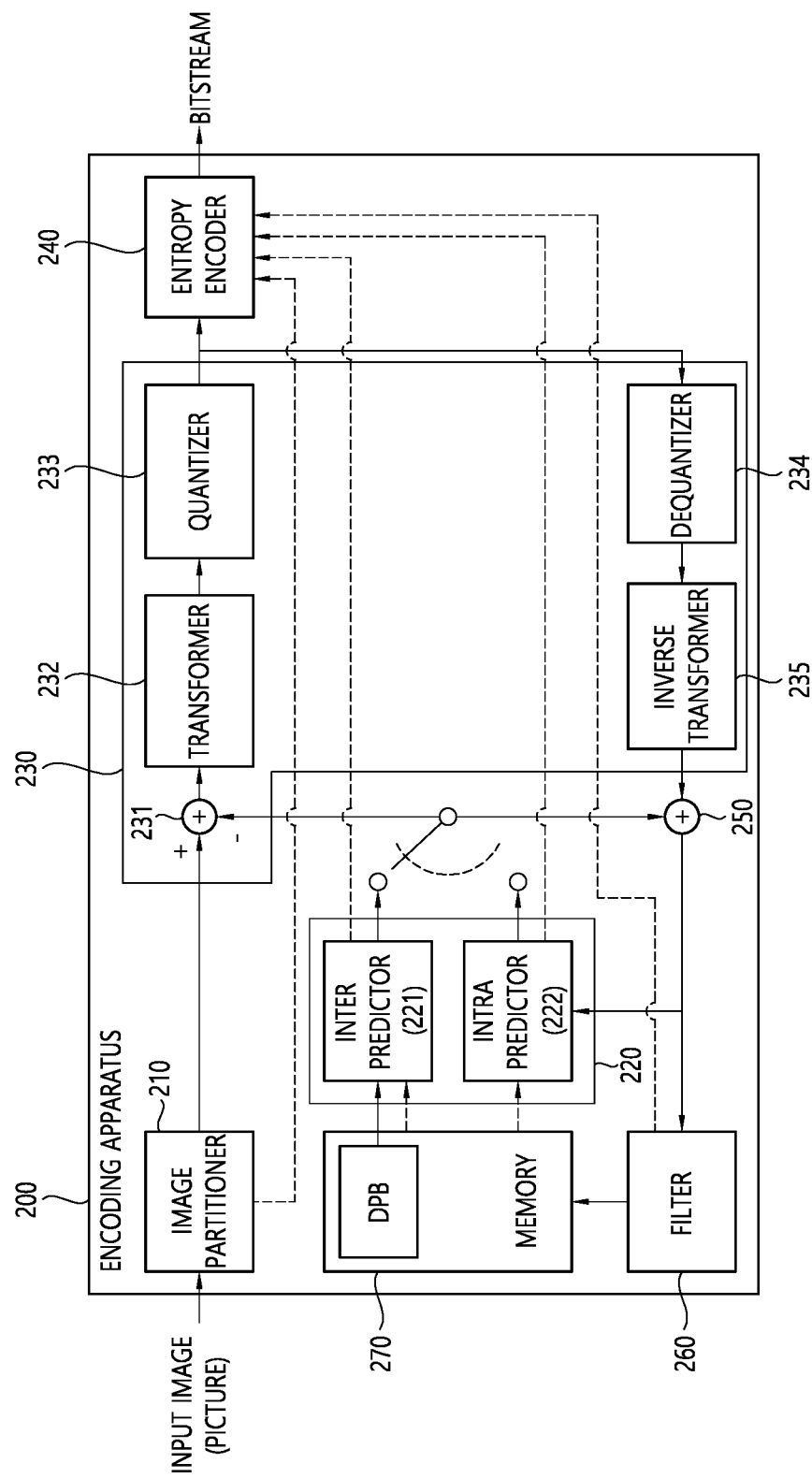
FIG. 2 is a diagram for schematically explaining a configuration of a video/image encoding apparatus applicable to the exemplary embodiments of the present document.

FIG. 2 is a schematic diagram illustrating a configuration of a video/image encoding apparatus to which the embodiment(s) of the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information about the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information about the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loéve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information about the quantized transform coefficients) and output a bitstream. The information about the quantized transform coefficients may be referred to as residual information. The quantizer 233 may rearrange block type quantized transform coefficients into a one-dimensional vector form based on a coefficient scanning order and generate information about the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filter process, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
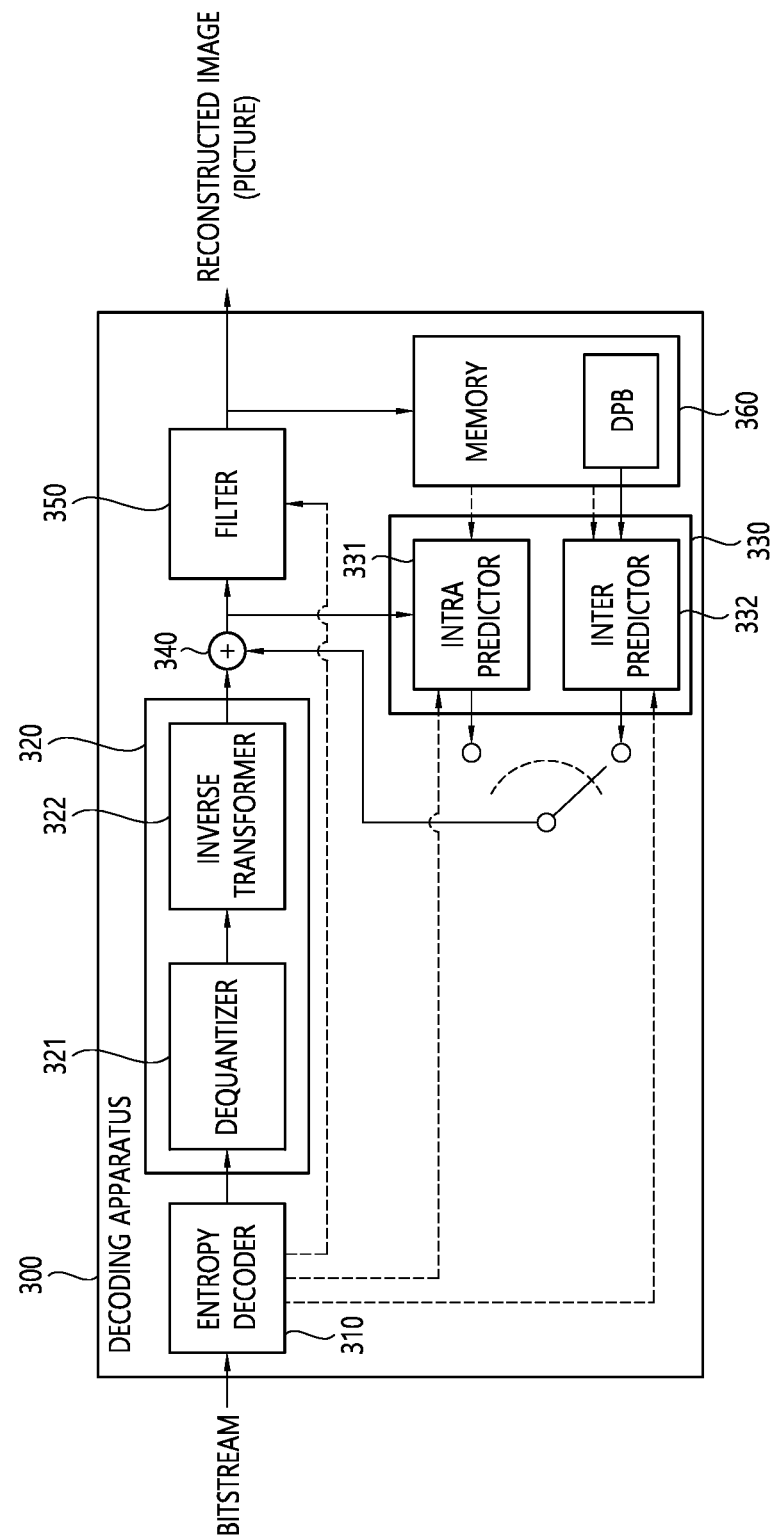
FIG. 3 is a diagram for schematically explaining a configuration of a video/image decoding apparatus applicable to the exemplary embodiments of the present document.

FIG. 3 is a schematic diagram illustrating a configuration of a video/image decoding apparatus to which the embodiment(s) of the present document may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information about various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information about the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information about filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information about the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information about the palette table and the palette index.

The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture.

For example, the inter predictor 332 may configure a motion information candidate list based on neighboring blocks and derive a motion vector of the current block and/or a reference picture index based on the received candidate selection information. Inter prediction may be performed based on various prediction modes, and the information about the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filter process, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, a prediction is performed to enhance compression efficiency. A predicted block including prediction samples for a current block, that is, a target coding block, can be generated through the prediction. In this case, the predicted block includes the prediction samples in a spatial domain (or pixel domain). The predicted block is identically derived in the encoding apparatus and the decoding apparatus. The encoding apparatus can enhance image coding efficiency by signaling, to the decoding apparatus, information about a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

Further, to improve subjective/objective image qualities, the encoding apparatus/the decoding apparatus may apply various filtering methods to the reconstructed picture to generate a modified reconstructed picture. The modified reconstructed picture may be stored in the memories, specifically, the DPB of the memories 270, 360 of the encoding apparatus/the decoding apparatus. Various filtering methods may include, for example, a deblocking filter, a sample adaptive offset, an adaptive loop filter, and a bilateral filter.

Meanwhile, in the image/video coding, the picture constituting the image/the video may be encoded/decoded in a series of decoding order. A picture order corresponding to an output order of the decoded picture may be set to be different from the decoding order, and based on the above, a backward prediction as well as a forward prediction may be performed upon inter prediction.

Figure 4:
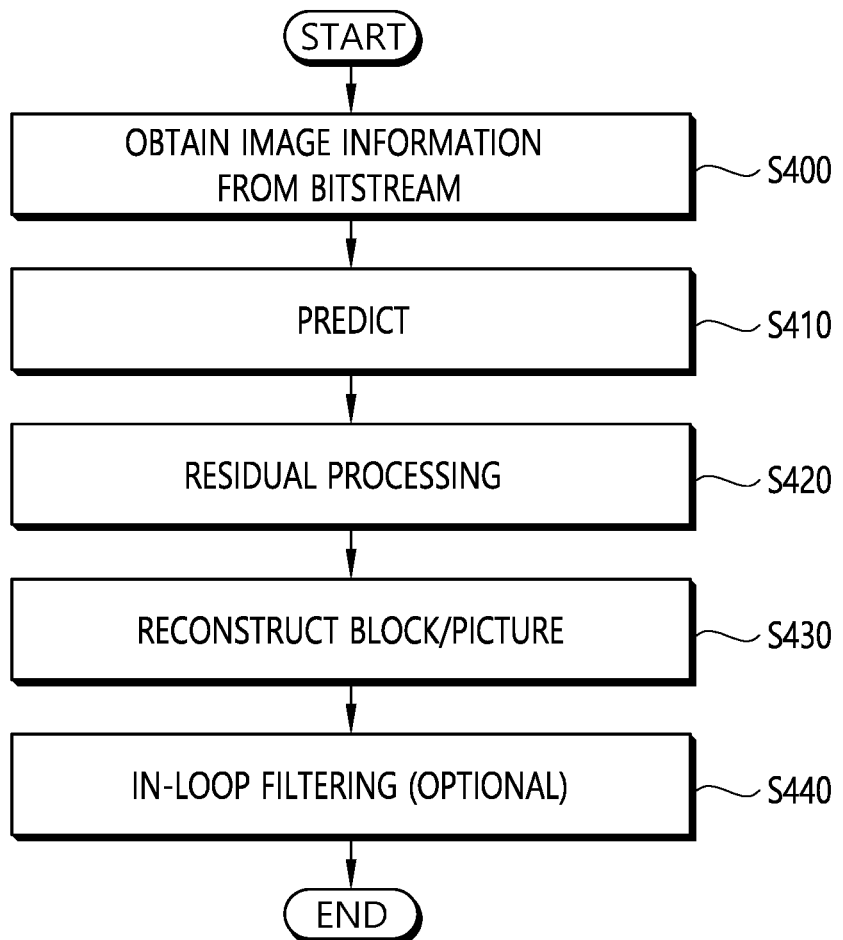
FIG. 4 illustrates an example of a schematic picture decoding procedure to which the exemplary embodiment (s) of the present document is (are) applicable.

FIG. 4 illustrates an example of a schematic picture decoding procedure to which the exemplary embodiment (s) of the present document is (are) applicable.

In FIG. 4, S400 may be performed by the entropy decoder 310 of the decoding apparatus described above with reference to FIG. 3, S410 may be performed by the predictor 330 thereof, S420 may be performed by the residual processor 320 thereof, S430 may be performed by the adder 340 thereof, and S440 may be performed by the filter 350 thereof. S400 may include an information decoding procedure described in the present document, S410 may include inter/intra prediction procedures described in the present document, S420 may include a residual processing procedure described in the present document, S430 may include a block/picture reconstruction procedure described in the present document, and S440 may include an in-loop filtering procedure described in the present document.

Referring to FIG. 4, the picture decoding procedure may schematically include the image/video information acquisition procedure (S400) (through the decoding) from the bitstream, the picture reconstruction procedure (S410 to S430), and the in-loop filtering procedure (S440) for the reconstructed picture, as described with reference to FIG. 3.

The picture reconstruction procedure (S430) may be performed based on the predicted samples and the residual samples acquired by the inter/intra predictions (S410) and the residual processing (S420) (dequantization for the quantized transform coefficient, inverse transform) process described in the present document. The modified reconstructed picture may be generated by the in-loop filtering procedure for the reconstructed picture generated by the picture reconstruction procedure, the modified reconstructed picture may be output as the decoded picture, and may also be stored in a decoding picture buffer of the decoding apparatus or the memory 360 thereof and used as the reference picture in the inter prediction procedure upon decoding the picture later. In some cases, the in-loop filtering procedure may be omitted, and in this case, the reconstructed picture may be output as the decoded picture, and may also be stored in the decoding picture buffer of the decoding apparatus or the memory 360 thereof and used as the reference picture in the inter prediction procedure upon decoding the picture later.

As described above, the in-loop filtering procedure (S440) may include the deblocking filter procedure, the sample adaptive offset (SAO) procedure, the adaptive loop filter (ALF) procedure, and/or the bi-lateral filter procedure, and some or all thereof may be omitted. Further, one or some of the deblocking filter procedure, the sample adaptive offset (SAO) procedure, the adaptive loop filter (ALF) procedure, and the bi-lateral filter procedure may be sequentially applied, or all thereof may also be sequentially applied. For example, the deblocking filter procedure is applied to the reconstructed picture and then the SAO procedure may be performed. Alternatively, for example, the deblocking filter procedure is applied to the reconstructed picture and then the ALF procedure may be performed. Likewise, this may also be performed in the encoding apparatus.

Figure 5:
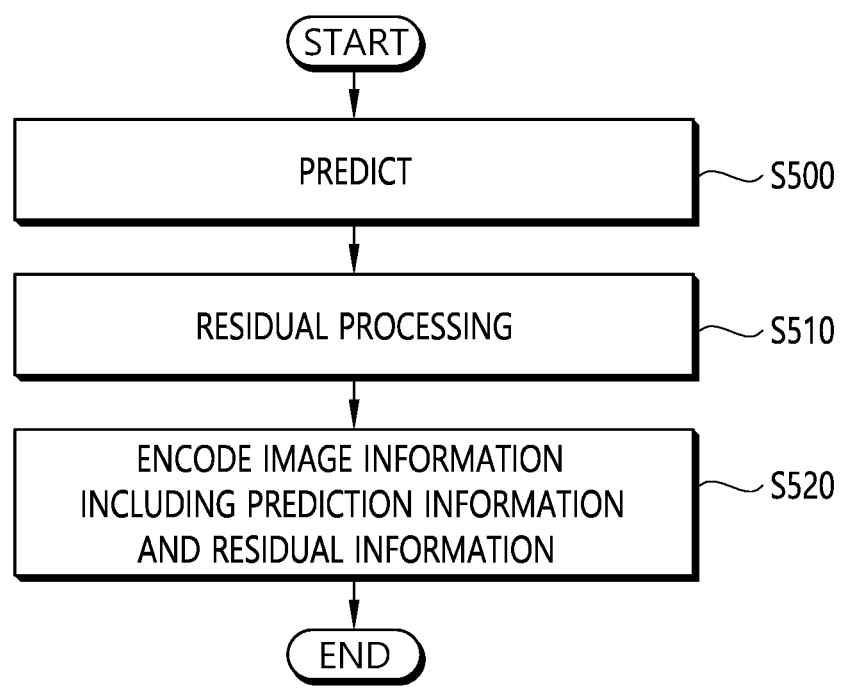
FIG. 5 illustrates an example of schematic picture encoding procedure to which the exemplary embodiment (s) of the present document is (are) applicable.

FIG. 5 illustrates an example of the schematic picture encoding procedure to which the exemplary embodiment (s) of the present document is (are) applicable.

In FIG. 5, S500 may be performed by the predictor 220 of the encoding apparatus described above with reference to FIG. 2, S510 may be performed by the residual processor 230 thereof, and S520 may be performed by the entropy encoder 240 thereof. S500 may include the inter/intra prediction procedures described in the present document, S510 may include the residual processing procedure described in the present document, and S520 may include the information encoding procedure described in the present document.

Referring to FIG. 5, the picture encoding procedure may schematically include a procedure of generating the reconstructed picture for the current picture and a procedure (optional) of applying the in-loop filtering to the reconstructed picture as well as a procedure of encoding information (e.g., prediction information, residual information, or partitioning information) for reconstructing the picture to output the encoded information in the form of the bitstream as described with reference to FIG. 2.

The encoding apparatus may derive (modified) residual samples from the quantized transform coefficient by the dequantizer 234 and the inverse transformer 235, and generate the reconstructed picture based on the predicted samples which are the output in S500 and the (modified) residual samples. The thus generated reconstructed picture may be the same as the aforementioned reconstructed picture generated by the decoding apparatus. The modified reconstructed picture may be generated by the in-loop filtering procedure for the reconstructed picture, and may be stored in the decoding picture buffer or the memory 270, and as in the case of the decoding apparatus, used as the reference picture in the inter prediction procedure upon encoding the picture later. As described above, in some cases, some or all of the in-loop filtering procedure may be omitted. If the in-loop filtering procedure is performed, the (in-loop) filtering-related information (parameter) is encoded by the entropy encoder 240 and outputted in the form of the bitstream, and the decoding apparatus may perform the in-loop filtering procedure in the same method as that of the encoding apparatus based on the filtering-related information.

It is possible to reduce noises generated upon coding the image/the video, such as blocking artifact and ringing artifact by the in-loop filtering procedure, and to enhance subjective/objective visual qualities. Further, by performing the in-loop filtering procedure both in the encoding apparatus and the decoding apparatus, the encoding apparatus and the decoding apparatus may derive the same prediction results, increase reliability of the picture coding, and reduce an amount of data to be transmitted for coding the picture.

As described above, the picture reconstruction procedure may be performed in the encoding apparatus as well as in the decoding apparatus. The reconstructed block may be generated based on the intra prediction/the inter prediction in units of each block, and the reconstructed picture including the reconstructed blocks may be generated. If a current picture/slice/tile group is an I picture/slice/tile group, blocks included in the current picture/slice/tile group may be reconstructed based on only the intra prediction. Meanwhile, if the current picture/slice/tile group is a P or B picture/slice/tile group, blocks included in the current picture/slice/tile group may be reconstructed based on the intra prediction or the inter prediction. In this case, the inter prediction may be applied to some blocks in the current picture/slice/tile group, and the intra prediction may also be applied to other blocks. A color component of the picture may include a luma component and a chroma component, and the methods and exemplary embodiments proposed in the present document may be applied to the luma component and the chroma component unless explicitly limited in the present document.

Meanwhile, as described above, the encoding apparatus/the decoding apparatus may reconstruct the picture in units of block. If the image is reconstructed in units of block, a block distortion may occur in a boundary between the blocks in the reconstructed picture. Therefore, the encoding apparatus and the decoding apparatus may use the deblocking filter to remove the block distortion occurring in the boundary between the blocks in the reconstructed picture. The deblocking filter procedure may, for example, derive a target boundary in the reconstructed picture, determine a boundary strength (bs) for the target boundary, and perform the deblocking filtering for the target boundary based on the bs. The bs may be determined based on prediction modes of two blocks adjacent to the target boundary, a difference between the motion vectors thereof, whether the reference pictures thereof are the same, and whether a non-zero significant coefficient exists therein.

Figure 6:
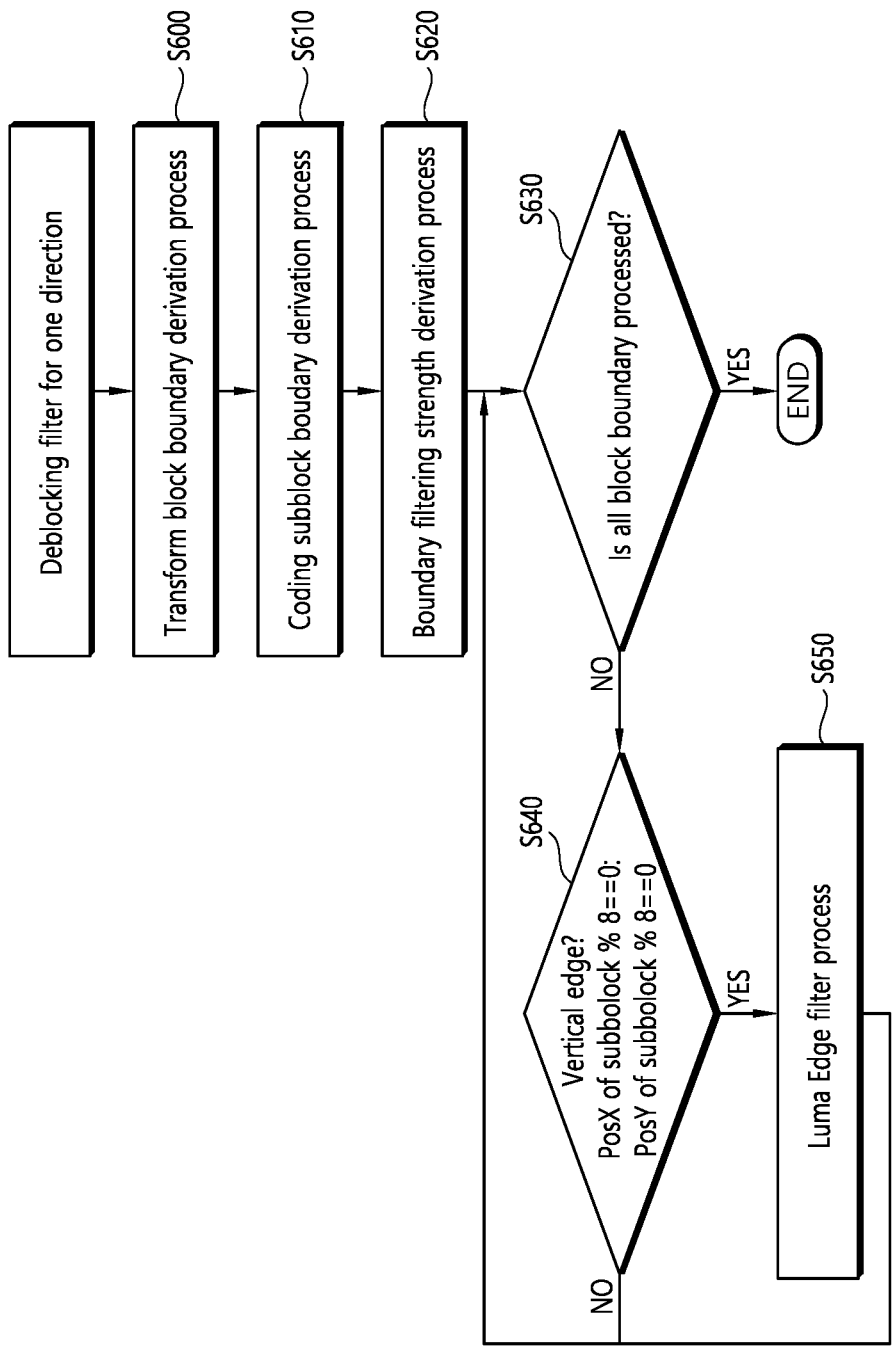
FIG. 6 exemplarily illustrates an exemplary embodiment of a method for performing a deblocking filter process.

FIG. 6 exemplarily illustrates an exemplary embodiment of a method for performing the deblocking filter process. The method illustrated in FIG. 6 may be performed by the aforementioned filter 260 in the encoding apparatus illustrated in FIG. 2 and the aforementioned filter 350 in the decoding apparatus illustrated in FIG. 3.

Referring to FIG. 6, the encoding apparatus/the decoding apparatus may derive the boundary between the blocks on which the deblocking filtering is performed in the reconstructed picture. Meanwhile, the boundary on which the deblocking filtering is performed may be referred to as an edge. Further, the boundary on which the deblocking filtering is performed may include two types, and the two types may be a vertical boundary and a horizontal boundary. The vertical boundary may be referred to as a vertical edge, and the horizontal boundary may be referred to as a horizontal edge. The encoding apparatus/the decoding apparatus may perform the deblocking filtering for the vertical edge, and perform the deblocking filtering for the horizontal edge.

When performing the deblocking filtering for one direction (i.e., the deblocking filtering for the vertical boundary or the deblocking filtering for the horizontal boundary), the encoding apparatus/the decoding apparatus may derive a transform block boundary (S600). The encoding apparatus/the decoding apparatus may derive a coding subblock boundary (S610).

The encoding apparatus/the decoding apparatus may derive the block boundary on which the deblocking filtering is performed based on a grid of an N×N size.

For example, the encoding apparatus/the decoding apparatus may derive the block boundary on which the deblocking filtering is performed based on whether the boundary of the block (the transform block or the coding subblock) corresponds to the grid of the N×N size. In other words, for example, the encoding apparatus/the decoding apparatus may derive the block boundary on which the deblocking filtering is performed based on whether the boundary of the block (the transform block or the coding subblock) is the block boundary positioned on the grid of the N×N size. The encoding apparatus/the decoding apparatus may derive the boundary of the block corresponding to the grid of the N×N size as the block boundary on which the deblocking filtering is performed. Here, the grid of the N×N size may mean a boundary derived by splitting the reconstructed picture into a square of the N×N size. The grid of the N×N size may be, for example, a grid of a 4×4 or 8×8 size.

The encoding apparatus/the decoding apparatus may determine the boundary strength (bs) of the boundary on which the deblocking filtering is performed (S620). The bs may also be referred to as a boundary filtering strength.

The encoding apparatus/the decoding apparatus may determine the bs based on the blocks adjacent to the boundary on which the deblocking filtering is performed. For example, a case of obtaining the bs value of the boundary (block edge) between a block P and a block Q may be assumed. In this case, the encoding apparatus/the decoding apparatus may determine the bs value of the boundary based on information about positions of the block P and the block Q and/or whether the block P and the block Q are coded in the intra mode.

Here, the block P may represent a block including a p0 sample adjacent to the boundary on which the deblocking filtering is performed, and the block Q may represent a block including a q0 sample adjacent to the boundary on which the deblocking filtering is performed.

For example, the p0 may represent a sample of a block adjacent to a left or a top of the boundary on which the deblocking filtering is performed, and the q0 may represent a sample of a block adjacent to a right or a bottom of the boundary on which the deblocking filtering is performed. As an example, if a direction of the filtering boundary is a vertical direction (i.e., if the filtering boundary is the vertical boundary), the p0 may represent the sample of the block adjacent to the left of the boundary on which the deblocking filtering is performed, and the q0 may represent the sample of the block adjacent to the right of the boundary on which the deblocking filtering is performed. Alternatively, as another example, if the direction of the filtering boundary is a horizontal direction (i.e., if the filtering boundary is the horizontal boundary), the p0 may represent the sample of the block adjacent to the top of the boundary on which the deblocking filtering is performed, and the q0 may represent the sample of the block adjacent to the bottom of the boundary on which the deblocking filtering is performed.

The encoding apparatus/the decoding apparatus may perform the deblocking filtering based on the bs. For example, the encoding apparatus/the decoding apparatus may determine whether the filtering process for all block boundaries in the reconstructed picture is performed (S630), and if the filtering process for all block boundaries is not performed, the encoding apparatus/the decoding apparatus may determine whether the position of the boundary of the subblock corresponds to the grid of the N×N size (e.g., 8×8 grid) (S640). For example, it may be determined whether a remainder derived by dividing the x component and the y component of the boundary position of the subblock by an N is 0. If the remainder derived by dividing the x component and the y component of the position of the boundary of the subblock by the N is 0, the position of the boundary of the subblock may correspond to the grid of the N×N size.

If the position of the boundary of the subblock corresponds to the grid of the N×N size, the encoding apparatus/the decoding apparatus may perform the deblocking filtering on the boundary based on the bs of the boundary (S650).

At this time, based on the determined bs value, a filter applied to the boundary between the blocks may be determined. The filter may be divided into a strong filter and a weak filter. The encoding apparatus/the decoding apparatus may perform the filtering for a boundary at a position at which the block distortion is highly likely to occur in the reconstructed picture and a boundary at a position at which the block distortion is less likely to occur therein with different filters, thereby enhancing coding efficiency.

The encoding apparatus/the decoding apparatus may perform the deblocking filtering on the boundary between the blocks using the determined filter (e.g., the strong filter or the weak filter). If the deblocking filtering processes for all of the boundaries between the blocks in the reconstructed picture are performed, the deblocking filtering process may be terminated.

Hereinafter, the present document proposes a method for determining the boundary strength (bs) in consideration of the characteristics of a current picture referencing (CPR) block in the process of performing the deblocking filtering, and determining whether to perform a boundary filtering for the CPR block based on the determined boundary strength.

Meanwhile, the CPR is a method for performing the prediction with reference to the current picture, and may be a concept included in an intra block copy (IBC) prediction mode. In other words, the IBC basically performs the prediction in the current picture, and thus may also be referred to as the CPR. Further, the IBC may be performed similar to the inter prediction in that the reference block is derived in the current picture. In other words, the IBC may use at least one of the inter prediction techniques to be described in the present document, and for example, use at least one of the aforementioned methods for deriving the motion information (motion vector).

For example, whether the IBC is applied to the current block may be indicated based on an IBC flag (e.g., pred_mode_ibc_flag). The IBC flag (e.g., pred_mode_ibc_flag) may be coded with a syntax element and generated in the form of the bitstream, and signaled from the encoding apparatus to the decoding apparatus through the bitstream.

For the IBC prediction, the encoding apparatus may derive an optimal block vector (or motion vector) for the current block (e.g., CU) by performing a block matching (BM). The derived block vector (or motion vector) may be signaled to the decoding apparatus through the bitstream using a method similar to the aforementioned signaling of the motion information (motion vector) in the inter prediction. The decoding apparatus may derive the reference block for the current block in the current picture through the signaled block vector (motion vector), and as a result, derive a prediction signal (predicted block or predicted samples) for the current block. Here, the block vector corresponds to the aforementioned motion vector to represent displacement from the current block to the reference block positioned in the already reconstructed region in the current picture. Therefore, the block vector (or motion vector) may also be referred to as a displacement vector. Hereinafter, the motion vector in the IBC may correspond to the block vector or the displacement vector. Further, an MVD in the IBC may be referred to as a block vector difference (BVD). The motion vector of the current block may include a motion vector for the luma component (luma motion vector) or a motion vector for the chroma component (chroma motion vector). For example, the luma motion vector for the CU coded in the IBC mode may be an integer sample unit (i.e., integer precision). The chroma motion vector may also be clipped in an integer sample unit. As described above, the IBC may use at least one of the inter prediction techniques, and for example, if the IBC is applied like an AMVR, 1-pel and 4-pel motion vector precision may be switched.

At the CU level, the IBC prediction mode may be signaled through the flag, and signaled in an IBC (A)MVP mode or IBC skip/merge modes.

For example, in the IBC skip/merge modes, the block vector of the current block may be derived using a merge candidate index. Here, the merge candidate index may represent whether any of the block vectors in the list configured based on neighboring candidate blocks coded in the IBC mode is used to predict the current block. The merge candidate list may be configured to include a spatial candidate, a historical motion vector prediction (HMVP) candidate, and a pairwise candidate.

In the IBC (A)MVP mode, the block vector difference (BVD) may be coded in the same method as that of the MVD. The block vector prediction method may use two candidates as a predictor, and two candidates may be derived from a left neighboring block (coded in the IBC mode) and a top neighboring block (coded in the IBC mode). At this time, if the left neighboring block or the top neighboring block is not available, a default block vector may be used as the predictor. The flag may be signaled as index information for indicating the block vector predictor.

Hereinafter, a method is proposed to perform the deblocking filtering by determining the boundary strength (bs) based on the prediction modes of two blocks (the block P and the block Q) adjacent to the boundary on which the deblocking filtering is performed in the reconstructed picture. Particularly, a method is provided to determine the boundary strength (bs) in consideration of whether the block P and the block Q are the CPR blocks for which the prediction is performed with reference to the current picture.

Here, as described above, the block P may represent the block including the p0 sample adjacent to the boundary on which the deblocking filtering is performed, and the block Q may represent the block including the q0 sample adjacent to the boundary on which the deblocking filtering is performed. For example, the p0 may represent the sample of the block adjacent to the left of the boundary on which the deblocking filtering is performed, and the q0 may represent the sample of the block adjacent to the right of the boundary on which the deblocking filtering is performed. Alternatively, the p0 may represent the sample of the block adjacent to the top of the boundary on which the deblocking filtering is performed, and the q0 may represent the sample of the block adjacent to the bottom of the boundary on which the deblocking filtering is performed.

According to the exemplary embodiment, as expressed in Table 1 below, the boundary strength may be determined. Table 1 expresses an example of deriving a value of the boundary strength based on the prediction modes of the block P and the block Q, a difference between the motion vectors thereof, whether the reference pictures thereof are the same, and whether the non-zero significant coefficient exists therein. For example, as expressed in Table 1, if at least one of the block P and the block Q is coded in the CPR mode, the boundary strength may be determined as 0.

TABLE 1

| Condition | BS |
|---|---|
| The block P or Q is coded in the CPR mode | 0 |
| The blocks P and Q are not coded in the CPR mode, and the block P or Q is coded in an intra mode | 2 |
| The block P or Q is coded in an inter mode, and a non-zero residual coefficient exists in the blocks P and Q | 1 |
| Case where the block P or Q is coded in the inter mode and a residual coefficient does not exist in the blocks P and Q but the MVs of the blocks P and Q are different when rounded with an integer-pel | 1 |
| Case where the block P or Q is coded in the inter mode and a residual coefficient does not exist in the blocks P and Q, and the MVs of the blocks P and Q are the same when rounded with an integer-pel but the blocks P and Q refer to different reference pictures | 1 |
| Other cases | 0 |

According to another exemplary embodiment, as expressed in Table 2 below, the boundary strength may be determined. Table 2 expresses an example of deriving the value of the boundary strength based on the prediction modes of the blocks P and Q, the difference between the motion vectors thereof, whether the reference pictures thereof are the same, and whether the non-zero significant coefficient exists therein. For example, as expressed in Table 2, if both the block P and the block Q are coded in the CPR mode, the boundary strength may be determined as 0, and if only any one of the block P and the block Q is coded in the CPR mode, the boundary strength may be determined as 1.

TABLE 2

| Condition | BS |
|---|---|
| Both the blocks P and Q are coded in the CPR mode | 0 |
| Both the blocks P and Q are not coded in the CPR mode but one of two is coded in the CPR mode | 1 |
| The blocks P and Q are not coded in the CPR mode, and the block P or Q is coded in the intra mode | 2 |
| The block P or Q is coded in the inter mode, and a non-zero residual coefficient exists in the blocks P and Q | 1 |
| Case where the block P or Q is coded in the inter mode and the residual coefficient does not exist in the blocks P and Q but the MVs of the blocks P and Q are different when rounded with an integer-pel | 1 |
| Case where the block P or Q is coded in the inter mode and a residual coefficient does not exist in the blocks P and Q and the MVs of the blocks P and Q are the same when rounded with an integer-pel but the blocks P and Q refer to different reference pictures | 1 |
| Other cases | 0 |

Figure 7:
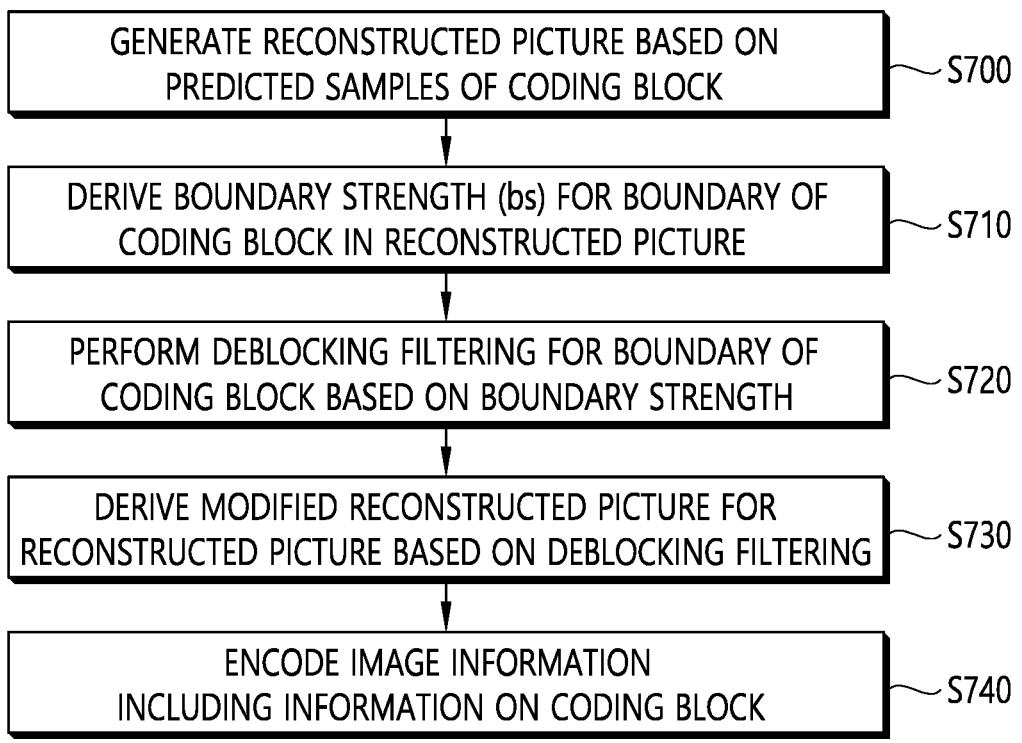
FIG. 7 is a flowchart schematically illustrating an encoding method which may be performed by an encoding apparatus according to the exemplary embodiment of the present document.

FIG. 7 is a flowchart schematically illustrating an encoding method which may be performed by an encoding apparatus according to the exemplary embodiment of the present document.

The method illustrated in FIG. 7 may be performed by the encoding apparatus 200 illustrated in FIG. 2. Specifically, step S700 illustrated in FIG. 7 may be performed by the adder 250 of the encoding apparatus 200 illustrated in FIG. 2, steps S710 to S730 illustrated in FIG. 7 may be performed by the filter 260 of the encoding apparatus 200 illustrated in FIG. 2, and step S740 illustrated in FIG. 7 may be performed by the entropy encoder 240 of the encoding apparatus 200 illustrated in FIG. 2. Further, the method illustrated in FIG. 7 may include the aforementioned exemplary embodiments in the present document. Therefore, in FIG. 7, a detailed description of the contents overlapping the aforementioned exemplary embodiments will be omitted and simplified.

Referring to FIG. 7, the encoding apparatus may generate the reconstructed picture based on the predicted samples of the coding block (S700).

According to an exemplary embodiment, the encoding apparatus may determine whether the inter prediction is performed for the coding block or the intra prediction is performed for the coding block, and a specific inter prediction mode or a specific intra prediction mode may be determined based on an RD cost. The encoding apparatus may derive the predicted samples for the coding block according to the determined mode.

Further, the encoding apparatus may generate the reconstructed picture based on the predicted samples of the coding block. In other words, the encoding apparatus may derive the residual samples through the subtraction between original samples and the predicted samples for the coding block, and generate the reconstructed samples based on the residual samples and the predicted samples. The encoding apparatus may generate the reconstructed block based on the reconstructed samples for the coding block in the picture, and generate the reconstructed picture including the reconstructed blocks.

The encoding apparatus may derive the boundary strength (bs) of the boundary of the coding block in the reconstructed picture (S710).

In other words, since the encoding apparatus reconstructs the picture in units of block, the block distortion may occur on the boundary between the coding blocks in the reconstructed picture. Therefore, the encoding apparatus may apply the deblocking filtering to remove the block distortion occurring at the boundary between the coding blocks in the reconstructed picture, and at this time, determine the boundary strength according to the degree of the block distortion.

According to the exemplary embodiment, the encoding apparatus may determine the boundary between the coding blocks in the reconstructed picture, and derive the boundary strength based on a first block and a second block adjacent to the determined boundary.

Here, the boundary between the coding blocks refers to a target boundary on which the deblocking filtering is performed, and the target boundary may include a vertical boundary and a horizontal boundary. For example, the encoding apparatus may derive a boundary strength for the vertical boundary and a boundary strength for the horizontal boundary, and perform the deblocking filtering for the vertical boundary and the horizontal boundary based on each boundary strength.

Further, as described above, the first block and the second block may mean the block P and the block Q. The block P may represent the block including the p0 sample adjacent to the boundary on which the deblocking filtering is performed, and the block Q may represent the block including the q0 sample adjacent to the boundary on which the deblocking filtering is performed. For example, the p0 may represent the sample of the block adjacent to the left of the boundary on which the deblocking filtering is performed, and the q0 may represent the sample of the block adjacent to the right of the boundary on which the deblocking filtering is performed. Alternatively, the p0 may represent the sample of the block adjacent to the top of the boundary on which the deblocking filtering is performed, and the q0 may represent the sample of the block adjacent to the bottom of the boundary on which the deblocking filtering is performed. In other words, the first block may be a left block (block P) with respect to the target boundary (i.e., vertical boundary), and the second block may be a right block (block Q) with respect to the target boundary (i.e., vertical boundary). Alternatively, the first block may be a top block (block P) with respect to the target boundary (i.e., horizontal boundary), and the second block may be a bottom block (block Q) with respect to the target boundary (i.e., horizontal boundary).

In other words, the encoding apparatus may derive the value of the boundary strength based on the prediction modes of the first block (block P) and the second block (block Q) adjacent to the target boundary, the difference between the motion vectors thereof, whether the reference pictures thereof are the same, and whether the non-zero significant coefficient exists therein. At this time, the boundary strength may be derived as a value of 0 to 2 as expressed in Table 1 or Table 2 expressed above.

According to the exemplary embodiment, the encoding apparatus may derive the boundary strength based on the prediction modes of the first block (block P) and the second block (block Q) adjacent to the target boundary. For example, the boundary strength may be derived based on whether the prediction modes of the first block (block P) and the second block (block Q) are current picture referencing (CPR) modes which are coded with reference to the current picture. If both the prediction modes of the first block (block P) and the second block (block Q) are the CPR modes, the encoding apparatus may derive the value of the boundary strength as 0. If both the prediction modes of the first block (block P) and the second block (block Q) are not coded in the CPR mode but any one of the first block (block P) and the second block (block Q) is coded in the CPR mode, the encoding apparatus may derive the value of the boundary strength as 1. At this time, as an example, the prediction mode of the first block (block P) may be the CPR mode and the prediction mode of the second block (block Q) may be the inter prediction mode, and in this case, the value of the boundary strength may be derived as 1. Alternatively, as another example, the prediction mode of the first block (block P) may be the CPR mode and the prediction mode of the second mode (block Q) may be a palette mode, and in this case, the value of the boundary strength may be derived as 1. In other words, if the prediction modes of the first block (block P) and the second block (block Q) are different and any one of the first block (block P) and the second block (block Q) is the CPR mode, the value of the boundary strength may be derived as 1. If both the prediction modes of the first block (block P) and the second block (block Q) are not the CPR mode and the prediction mode of the first block (block P) or the second block (block Q) is coded in the intra prediction mode, the encoding apparatus may derive the value of the boundary strength as 2.

Further, the encoding apparatus may derive the boundary strength based on the prediction modes of the first block (block P) and the second block (block Q) adjacent to the target boundary, the difference between the motion vectors thereof, whether the reference pictures thereof are the same, and whether the non-zero significant coefficient exists therein. For example, if the first block (block P) or the second block (block Q) is coded in the inter prediction mode and the non-zero residual coefficient exists in the first block (block P) and the second block (block Q), the encoding apparatus may derive the value of the boundary strength as 1. Alternatively, if the first block (block P) or the second block (block Q) is coded in the inter prediction mode and the residual coefficient does not exist in the first block (block P) and the second block (block Q) but the motion vectors of the first block (block P) and the second block (block Q) are different when rounded by an integer unit sample (an integer-pel), the encoding apparatus may derive the value of the boundary strength as 1. Alternatively, if the first block (block P) or the second block (block Q) is coded in the inter prediction mode, the residual coefficient does not exist in the first block (block P) and the second block (block Q), and the motion vectors of the first block (block P) and the second block (block Q) are the same when rounded by the integer unit sample (integer-pel) but the first block (block P) and the second block (block Q) refer to different reference pictures, the encoding apparatus may derive the value of the boundary strength as 1. In other cases, the encoding apparatus may derive the value of the boundary strength as 0.

According to the exemplary embodiment, if the prediction mode in which the motion information is derived in units of subblock is applied to the coding block, for example, the coding block is predicted in an affine mode or a subblock-based merge mode, the encoding apparatus may determine the target boundary in units of subblock, and derive the boundary strength for the target boundary of the corresponding subblock. In this case, the encoding apparatus may perform the deblocking filtering based on the boundary strength derived with respect to the subblock in the coding block.

The encoding apparatus may perform the deblocking filtering on the boundary of the coding block based on the boundary strength derived as described above (S720).

According to the exemplary embodiment, the encoding apparatus may perform the deblocking filtering for the vertical boundary based on the boundary strength derived for the vertical boundary, and perform the deblocking filtering for the horizontal boundary based on the boundary strength derived for the horizontal boundary.

The encoding apparatus may derive the modified reconstructed picture for the reconstructed picture based on the deblocking filtering (S730).

In other words, the encoding apparatus may perform the deblocking filtering on the boundary of the coding block in the reconstructed picture based on the boundary strength, thereby deriving the reconstructed sample from which the blocking artifact is removed and generating the modified reconstructed picture based on the reconstructed sample. As a result, it is possible to remove the blocking artifact on the block boundary occurring due to the prediction performed in units of block (units of coding block or coding subblock), and to improve the visual quality of the reconstructed picture.

Further, as described above, to improve the subjective/objective image qualities as necessary, the encoding apparatus may further apply the in-loop filtering procedure such as the SAO procedure to the modified reconstructed picture.

The encoding apparatus may encode the image information including information on the coding block (S740).

Here, the information on the coding block may include prediction-related information of the coding block. For example, the prediction-related information may include prediction mode information of the coding block (e.g., the intra prediction mode, the inter prediction mode, the affine prediction mode, the subblock-based merge mode, or the IBC mode referring to the current picture). Further, the information on the coding block may include information on the residual samples derived based on the predicted samples of the coding block. For example, information on the residual samples may include information, such as value information, location information, a transform technique, a transform kernel, and a quantization parameter of the quantized transform coefficients derived by performing transform and quantization for the residual samples.

That is, the encoding apparatus may encode the image information including the information on the coding block to output the encoded image information in the form of the bitstream, and transmit the bitstream to the decoding apparatus through a network or a storage medium. Further, the encoding apparatus may encode information (e.g., deblocking filtering-related information) derived in the aforementioned process to generate the encoded information in the form of the bitstream.

Figure 8:
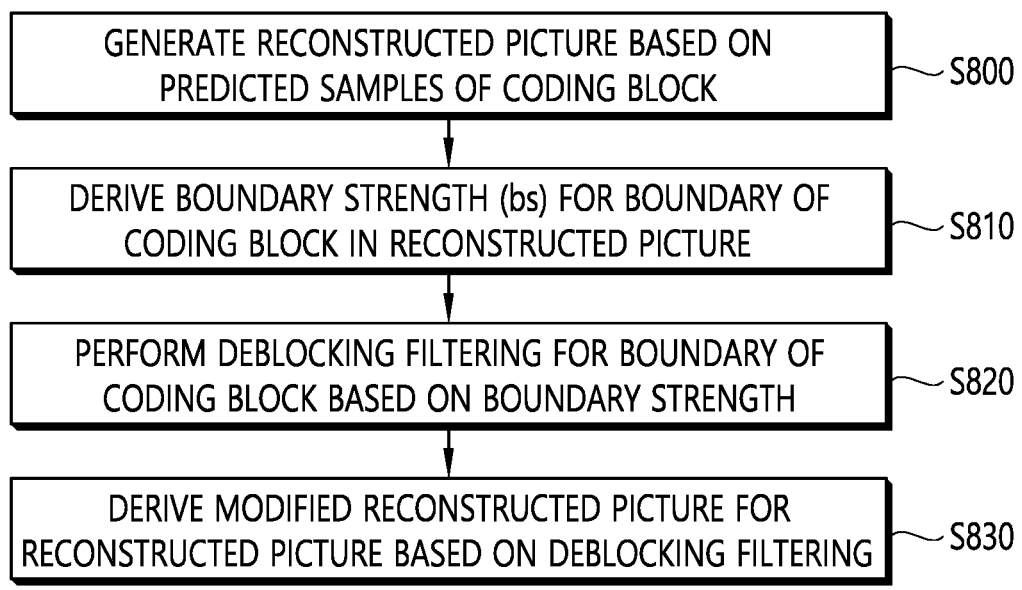
FIG. 8 is a flowchart schematically illustrating a decoding method which may be performed by a decoding apparatus according to the exemplary embodiment of the present document.

FIG. 8 is a flowchart schematically illustrating a decoding method which may be performed by the decoding apparatus according to the exemplary embodiment of the present document.

The method illustrated in FIG. 8 may be performed by the decoding apparatus 300 illustrated in FIG. 3. Specifically, step S800 illustrated in FIG. 8 may be performed by the adder 340 of the decoding apparatus 300 illustrated in FIG. 3, and steps S810 to S830 illustrated in FIG. 8 may be performed by the filter 350 of the decoding apparatus 300 illustrated in FIG. 3. Further, the method illustrated in FIG. 8 may include the aforementioned exemplary embodiments in the present document. Therefore, in FIG. 8, a detailed description of the contents overlapping the aforementioned exemplary embodiments will be omitted or simplified.

Referring to FIG. 8, the decoding apparatus may generate the reconstructed picture based on the predicted samples of the coding block (S800).

According to the exemplary embodiment, the decoding apparatus may receive the image information on the coding block through the bitstream. For example, the decoding apparatus may receive the image information including the prediction-related information on the coding block through the bitstream. At this time, the image information may include the prediction-related information on the coding block. The prediction-related information may include the information about the inter prediction mode or the intra prediction mode performed for the coding block. In other words, the decoding apparatus may perform the inter prediction or the intra prediction for the coding block based on the prediction-related information received through the bitstream, and derive the predicted samples of the coding block.

Further, the decoding apparatus may receive the image information including the residual information on the coding block through the bitstream. At this time, the image information may include the residual information on the coding block. The residual information may include transform coefficients for the residual sample. The decoding apparatus may derive the residual samples (or residual sample array) of the coding block based on the residual information.

The decoding apparatus may generate the reconstructed samples based on the predicted samples and the residual samples, and generate the reconstructed block based on the reconstructed samples for the coding block in the picture. Further, the decoding apparatus may generate the reconstructed picture including the reconstructed blocks.

The decoding apparatus may derive the boundary strength (bs) of the boundary of the coding block in the reconstructed picture (S810).

In other words, since the decoding apparatus reconstructs the picture in units of block, the block distortion may occur at the boundary between the coding blocks in the reconstructed picture. Therefore, the decoding apparatus may apply the deblocking filter process to remove the block distortion occurring at the boundary between the coding blocks in the reconstructed picture, and in this case, the boundary strength may be determined according to the degree of the block distortion.

According to the exemplary embodiment, the decoding apparatus may determine the boundary between the coding blocks in the reconstructed picture, and derive the boundary strength based on the first block and the second block adjacent to the determined boundary.

Here, the boundary between the coding blocks refers to the target boundary on which the deblocking filtering is performed, and the target boundary may include the vertical boundary and the horizontal boundary. For example, the decoding apparatus may derive the boundary strength for the vertical boundary and the boundary strength for the horizontal boundary, and perform the deblocking filtering on the vertical boundary and the horizontal boundary based on each boundary strength.

Further, as described above, the first block and the second block may mean the block P and the block Q. The block P may represent the block including the p0 sample adjacent to the boundary on which the deblocking filtering is performed, and the block Q may represent the block including the q0 sample adjacent to the boundary on which the deblocking filtering is performed. For example, the p0 may represent the sample of the block adjacent to the left of the boundary on which the deblocking filtering is performed, and the q0 may represent the sample of the block adjacent to the right of the boundary on which the deblocking filtering is performed. Alternatively, the p0 may represent the sample of the block adjacent to the top of the boundary on which the deblocking filtering is performed, and the q0 may represent the sample of the block adjacent to the bottom of the boundary on which the deblocking filtering is performed. In other words, the first block may be the left block (block P) with respect to the target boundary (i.e., vertical boundary), and the second block may be the right block (block Q) with respect to the target boundary (i.e., vertical boundary). Alternatively, the first block may be the top block (block P) with respect to the target boundary (i.e., horizontal boundary), and the second block may be the bottom block (block Q) with respect to the target boundary (i.e., horizontal boundary).

In other words, the decoding apparatus may derive the value of the boundary strength based on the prediction modes of the first block (block P) and the second block (block Q) adjacent to the target boundary, the difference between the motion vectors thereof, whether the reference pictures thereof are the same, and whether the non-zero significant coefficient exists therein. At this time, the boundary strength may be derived as a value of 0 to 2 as in Table 1 or Table 2 expressed above.

According to the exemplary embodiment, the decoding apparatus may derive the boundary strength based on the prediction modes of the first block (block P) and the second block (block Q) adjacent to the target boundary. For example, the boundary strength may be derived based on whether the prediction modes of the first block (block P) and the second block (block Q) are current picture referencing (CPR) modes which are coded with reference to the current picture. When both the prediction modes of the first block (block P) and the second block (block Q) are the CPR modes, the decoding apparatus may derive the value of the boundary strength as 0. If both the prediction modes of the first block (block P) and the second block (block Q) are not coded in the CPR mode but any one of the first block (block P) and the second block (block Q) is coded in the CPR mode, the decoding apparatus may derive the value of the boundary strength as 1. At this time, as an example, the prediction mode of the first block (block P) may be the CPR mode, and the prediction mode of the second block (block Q) may be the inter prediction mode, and at this time, the value of the boundary strength may be derived as 1. Alternatively, as another example, the prediction mode of the first block (block P) may be the CPR mode and the prediction mode of the second block (block Q) may be the palette mode, and in this case, the value of the boundary strength may be derived as 1. In other words, if the prediction modes of the first block (block P) and the second block (block Q) are different and any one of the first block (block P) and the second block (block Q) is the CPR mode, the value of the boundary strength may be derived as 1. If both the prediction modes of the first block (block P) and the second block (block Q) are not the CPR modes and the prediction mode of the first block (block P) or the second block (block Q) is coded in the intra prediction mode, the decoding apparatus may derive the value of the boundary strength as 2.

Further, the decoding apparatus may derive the boundary strength based on the prediction modes of the first block (block P) and the second block (block Q) adjacent to the target boundary, the difference between the motion vectors thereof, whether the reference pictures thereof are the same, and whether the non-zero significant coefficient exists therein. For example, if the first block (block P) or the second block (block Q) is coded in the inter prediction mode and the non-zero residual coefficient exists in the first block (block P) and the second block (block Q), the decoding apparatus may derive the value of the boundary strength as 1. Alternatively, if the first block (block P) or the second block (block Q) is coded in the inter prediction mode and the residual coefficient does not exist in the first block (block P) and the second block (block Q) but the motion vectors of the first block (block P) and the second block (block Q) are different when rounded by the integer unit sample (integer-pel), the decoding apparatus may derive the value of the boundary strength as 1. Alternatively, if the first block (block P) or the second block (block Q) is coded in the inter prediction mode, the residual coefficient does not exist in the first block (block P) and the second block (block Q), and the motion vectors of the first block (block P) and the second block (block Q) are the same when rounded by the integer unit sample (integer-pel) but the first block (block P) and the second block (block Q) refer to difference reference pictures, the decoding apparatus may derive the value of the boundary strength as 1. In other cases, the decoding apparatus may derive the value of the boundary strength as 0.

According to the exemplary embodiment, if the prediction mode in which motion information is derived in units of sub-block is applied to the coding block, for example, if the coding block is predicted in the affine mode or the subblock-based merge mode, the decoding apparatus may determine the target boundary in units of subblock and derive the boundary strength for the target boundary of the corresponding subblock. In this case, the decoding apparatus may perform the deblocking filtering based on the boundary strength derived for the subblock in the coding block.

The decoding apparatus may perform the deblocking filtering on the boundary of the coding block based on the boundary strength derived as described above (S820).

According to the exemplary embodiment, the decoding apparatus may perform the deblocking filtering on the vertical boundary based on the boundary strength derived for the vertical boundary, and perform the deblocking filtering on the horizontal boundary based on the boundary strength derived for the horizontal boundary.

The decoding apparatus may derive the modified reconstructed picture for the reconstructed picture based on the deblocking filtering (S830).

In other words, the decoding apparatus may perform the deblocking filtering on the boundary of the coding block in the reconstructed picture based on the boundary strength, thereby deriving the reconstructed sample from which the blocking artifact is removed, and generating the modified reconstructed picture based on the reconstructed sample. As a result, it is possible to remove the blocking artifact at the block boundary occurring due to the prediction performed in units of block (units of coding block or coding subblock), and to improve the visual quality of the reconstructed picture.

Further, as described above, to improve the subjective/objective image qualities as necessary, the decoding apparatus may further apply the in-loop filtering procedure such as the SAO procedure to the modified reconstructed picture.

In the above-described embodiments, the methods are explained based on flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip. In this case, information for implementation (ex. information about instructions) or an algorithm may be stored in a digital storage medium.

Furthermore, the decoding apparatus and the encoding apparatus to which this document is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a virtual reality (VR) device, an augmented reality (AR) device, a video telephony device, transportation means terminal (e.g., a vehicle (including autonomous vehicle) terminal, an aircraft terminal, and a vessel terminal), and a medical video device, and may be used to process a video signal or a data signal. For example, the over the top (OTT) video device may include a game console, a Blueray player, Internet access TV, a home theater system, a smartphone, a tablet PC, and a digital video recorder (DVR).

Furthermore, the processing method to which this document is applied may be produced in the form of a program executed by a computer, and may be stored in a computer-readable recording medium. Multimedia data having a data structure according to this document may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of this document may be implemented as a computer program product using program code. The program code may be performed by a computer according to an embodiment of this document. The program code may be stored on a carrier readable by a computer.

Figure 9:
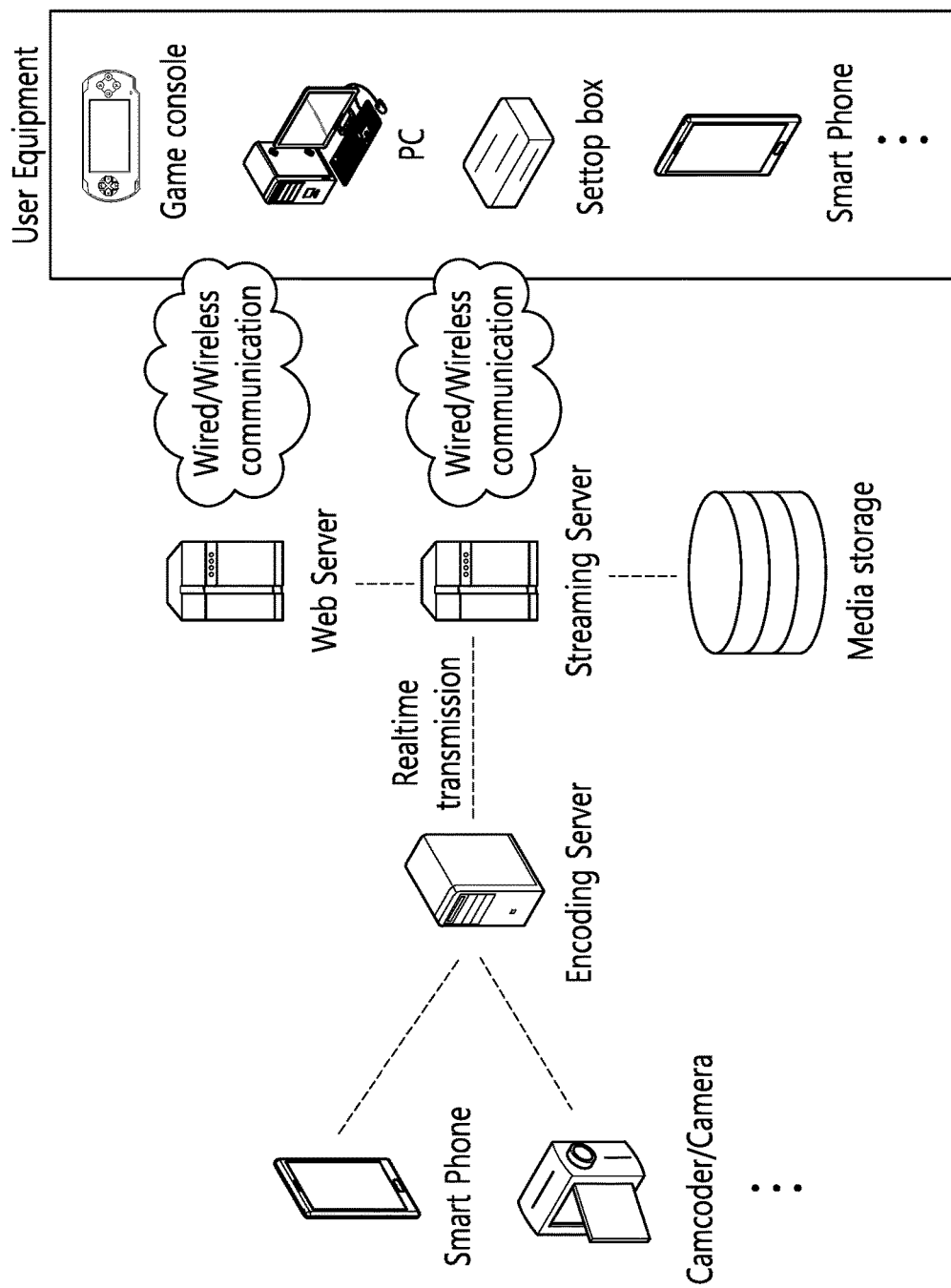
FIG. 9 illustrates an example of a content streaming system to which the exemplary embodiments disclosed in the present document are applicable.

FIG. 9 illustrates an example of a content streaming system to which embodiments disclosed in this document may be applied.

Referring to FIG. 9, the content streaming system to which the embodiments of the present document are applied may basically include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like.

Each server in the content streaming system may be operated as a distributed server, in which case data received from each server may be distributed.

What is claimed is:

1. An image decoding method performed by a decoding apparatus, the method comprising:
obtaining prediction mode information on a coding block through a bitstream;
deriving predicted samples of the coding block based on the prediction mode information;
generating a reconstructed picture based on the predicted samples of the coding block;
deriving a boundary strength (bs) for a boundary of the coding block in the reconstructed picture;
performing a deblocking filtering on the boundary of the coding block based on the boundary strength; and
deriving a modified reconstructed picture for the reconstructed picture based on the deblocking filtering,
wherein the boundary strength is derived based on prediction modes of a first block and a second block adjacent to the boundary of the coding block,
wherein based on the prediction modes of the first block and the second block being different, a value of the boundary strength is set equal to 1, and
wherein based on a prediction mode of the first block being a current picture referencing (CPR) mode which is coded with reference to a current picture and a prediction mode of the second block being palette mode, the value of the boundary strength is set equal to 1.

2. The image decoding method of claim 1, wherein the deriving of the boundary strength derives the value of the boundary strength as 1, based on a case where the prediction modes of the first block and the second block are different and the prediction mode of the first block is the CPR mode and the prediction mode of the second block is an inter prediction mode.

3. The image decoding method of claim 1, wherein the deriving of the boundary strength derives a value of the boundary strength as 0, based on a case where both the prediction modes of the first block and the second block are the CPR mode.

4. The image decoding method of claim 1, wherein the deriving of the boundary strength derives a value of the boundary strength as 2, based on a case where both the prediction modes of the first block and the second block are not the CPR mode and the prediction mode of the first block or the prediction mode of the second block is an intra prediction mode.

5. The image decoding method of claim 1, wherein the deriving of the boundary strength derives the boundary strength for a boundary of a subblock in the coding block, based on a case where the prediction mode in which motion information is derived in units of subblock is applied to the coding block.

6. An image encoding method performed by an encoding apparatus, the method comprising:
- determining a prediction mode of a coding block;
- deriving predicted samples of the coding block based on the prediction mode;
- generating a reconstructed picture based on the predicted samples of the coding block;
- deriving a boundary strength (bs) for a boundary of the coding block in the reconstructed picture;
- performing a deblocking filtering on the boundary of the coding block based on the boundary strength;
- deriving a modified reconstructed picture for the reconstructed picture based on the deblocking filtering; and
- encoding image information comprising prediction mode information related to the prediction mode of the coding block,
- wherein the boundary strength is derived based on prediction modes of a first block and a second block adjacent to the boundary of the coding block,
- wherein based on the prediction modes of the first block and the second block being different, a value of the boundary strength is set equal to 1, and
- wherein based on a prediction mode of the first block being a current picture referencing (CPR) mode which is coded with reference to a current picture and a prediction mode of the second block being palette mode, the value of the boundary strength is set equal to 1.

7. The image encoding method of claim 6, wherein the deriving of the boundary strength derives the value of the boundary strength as 1, based on a case where the prediction modes of the first block and the second block are different and the prediction mode of the first block is the CPR mode and the prediction mode of the second block is an inter prediction mode.

8. The image encoding method of claim 6, wherein the deriving of the boundary strength derives a value of the boundary strength as 0, based on a case where both the prediction modes of the first block and the second block are the CPR mode.

9. The image encoding method of claim 6, wherein the deriving of the boundary strength derives a value of the boundary strength as 2, based on a case where both the prediction modes of the first block and the second block are not the CPR mode and the prediction mode of the first block or the prediction mode of the second block is an intra prediction mode.

10. The image encoding method of claim 6, wherein the deriving of the boundary strength derives the boundary strength for a boundary of a subblock in the coding block, based on a case where the prediction mode in which motion information is derived in units of subblock is applied to the coding block.

11. A non-transitory computer-readable storage medium storing encoded image information generated by performing the steps of:
- determining a prediction mode of a coding block;
- deriving predicted samples of the coding block based on the prediction mode;
- generating a reconstructed picture based on the predicted samples of the coding block;
- deriving a boundary strength (bs) for a boundary of the coding block in the reconstructed picture;
- performing a deblocking filtering on the boundary of the coding block based on the boundary strength;
- deriving a modified reconstructed picture for the reconstructed picture based on the deblocking filtering; and
- encoding image information comprising prediction mode information related to the prediction mode of the coding block,
- wherein the boundary strength is derived based on prediction modes of a first block and a second block adjacent to the boundary of the coding block,
- wherein based on the prediction modes of the first block and the second block being different, a value of the boundary strength is set equal to 1, and
- wherein based on a prediction mode of the first block being a current picture referencing (CPR) mode which is coded with reference to a current picture and a prediction mode of the second block being palette mode, the value of the boundary strength is set equal to 1.

* * * * *